United States Patent Office 2,905,674
Patented Sept. 22, 1959

2,905,674

METHOD FOR PREPARING 3,3',5,5'-TETRAALKYL-4,4'-DIPHENOQUINONES

Allen H. Filbey, Walled Lake, Mich., assignor to Ethyl Corporation, New York, N. Y., a corporation of Delaware No Drawing. Application October 17, 1956
Serial No. 616,383

5 Claims. (Cl. 260—396)

This invention relates to the preparation of valuable organic compounds, namely, 3,3',5,5'-tetraalkyldiphenoquinones.

Heretofore, 3,3',5,5'-tetraalkyldiphenoquinones have been found useful as inhibitors of oxidation, peroxidation, polymerization and gum formation in gasolines, aldehydes, fatty oils, lubricating oils, ethers and similar compounds. It is also known that 3,3',5,5'-tetraalkyldiphenoquinones are especially useful as intermediates in the preparation of 3,3',5,5'-tetraalkyl-4,4'-dihydroxydiphenyls which are also effective inhibitors of oxidation.

To prepare many of these diphenoquinones, the most satisfactory known method involves oxidizing a 2,6-dialkylphenol using any of a range of oxidizing agents, notably nitric or chromic acids. In the case of 3,3',5,5'-tetraalkyldiphenoquinones in which each of the alkyl groups contains 2 or more carbon atoms, this prior method, while workable, leaves much to be desired. Among the difficulties encountered with this method are that the yields are low and that an impure reaction product ordinarily results requiring careful recrystallization procedures in order to recover a product of satisfactory purity. These drawbacks of the existing process arise chiefly from the tendency of these acidic oxidizing agents of causing dealkylation of at least some of the starting 2,6-dialkylphenol—especially where the alkyl groups are highly branched—and as a consequence various coupling products are produced concurrently. Another difficulty of this prior method in the case of 3,3',5,5'-tetraalkyldiphenoquinones in which the alkyl groups are highly branched was the need of very carefully controlling the reaction conditions in order to keep dealkylation and other side reactions from completely obscuring the desired oxidation reaction. A novel process of preparing 3,3',5,5'-tetraalkyldiphenoquinones has now been found which is free from the limitations and shortcomings described above.

An object of this invention is to provide a trouble-free process of preparing 3,3',5,5'-tetraalkyldiphenoquinones. Another object of this invention is to provide a process of preparing 3,3',5,5'-tetraalkyldiphenoquinones of high purity in good yields. Other objects of this invention will be apparent from the ensuing description.

According to this invention there is provided the unprecedented process of preparing 3,3',5,5'-tetraalkyldiphenoquinones which comprises contacting, in a substantially homogeneous liquid system and under reaction conditions, a 4-halo-2,6-dialkylphenol and a basic compound having an ionization constant characteristic of a base of at least about $1.6 \times 10^{-3}$ at 25° C., the halogen of said phenol having an atomic weight greater than 30 and at least one of the alkyl groups of said phenol being branched on its alpha carbon atom, said system containing at least about one mole of said basic compound per mole of said phenol. It will be evident that the process of this invention represents a marked departure from prior processes in that the present process involves the use of at least a stoichiometric amount of a strongly basic compound to effect concurrent oxidation and coupling instead of acids or other comparable conventional oxidizing agents.

Another amazing feature of the present process is that the oxidation-coupling reaction can be carried out very smoothly under conditions which might be expected to cause hydrolysis of the 4-halo-2,6-dialkylphenol. Thus, the results achieved by this process—high yields of high-purity 3,3',5,5'-tetraalkyldiphenoquinones—are not only totally unexpected but represent a substantial advance in the art. These features of the present process will become apparent still further hereinafter.

Another elegant feature of the present process is that the resulting 3,3',5,5'-tetraalkyldiphenoquinones can be easily recovered from the reaction medium by means of filtration, centrifugation, decantation or like procedures. Thus, there is no problem in recovering the 3,3',5,5'-tetraalkyldiphenoquinones prepared by the process of this invention. In addition, it is unnecessary to resort to time consuming and tedious recrystallization procedures or the like to obtain pure products, because the process of this invention functions so smoothly.

A preferred embodiment of this invention is to form the 4-halo-2,6-dialkylphenol in situ. Thus, a preferred embodiment of this invention is the process of preparing 3,3',5,5'-tetraalkyldiphenoquinones which comprises contacting, in a substantially homogeneous liquid system and under reaction conditions, a 2,6-dialkylphenol (i.e., unsubstituted in the para position), a halogen having an atomic weight greater than 30 and a basic compound having an ionization constant characteristic of a base of at least $1.6 \times 10^{-3}$ at 25° C., at least one of the alkyl groups of said phenol being branched on the alpha carbon atom, said system containing at least about one mole of said basic compound per mole of said phenol. Among the advantages of this preferred embodiment are the facts that this one-step process obviates the necessity of separately preparing and recovering the 4-halo-2,6-dialkylphenol and that the exothermic halogenation reaction, when carried out in situ, supplies heat to the reaction system which drives the oxidation-coupling reaction to completion. This last-mentioned advantage thus renders it unnecessary, in most cases, to supply heat from external sources.

While the process of this invention is well suited for the preparation of any 3,3',5,5'-tetraalkyldiphenoquinones, in which the alkyl groups contain no more than about 12 carbon atoms each, it is particularly well suited to the preparation of 3,3'-5,5'-tetraalkyldiphenoquinones where the alkyl groups are secondary or tertiary and each contain up to about 12 carbon atoms. As brought out above, it is this type of tetraalkyldiphenoquinone which is particularly difficult to prepare by prior methods and thus the present process fills a distinct need in the art. Superlative results are achieved in the preparation of 3,3',5,5'-tetra-tert-butyldiphenoquinone.

The precise nature of the basic compound used in the present process is unimportant provided it has an ionization constant characteristic of a base of at least about $1.6 \times 10^{-3}$ at 25° C. In other words, the base used in the present process is a strong base. It can be an organic base or an inorganic base. Non-limiting examples of suitable bases include guanidine; piperazine; diethylamine; dipropylamine; certain quaternary ammonium compounds, such as tetramethyl ammonium hydroxide, tetraethyl ammonium hydroxide, etc.; alkali metal alkoxides, such as sodium methylate, sodium ethylate, potassium methylate, potassium propylate, rubidium ethylate, cesium methylate; aqueous solutions of alkali metal hydroxides, such as aqueous sodium hydroxide, aqueous potassium hydroxide, aqueous rubidium hydroxide, aqueous cesium hydroxide, etc.; and the like. These and related bases, both organic and inorganic, are known in the art as strong bases and have ionization constants measured in aqueous solution of at least about $1.6 \times 10^{-3}$ at 25° C.

When an aqueous inorganic base, such as aqueous sodium hydroxide, is used, a solvent is employed to achieve substantial homogeneity of the reaction system. A wide variety of known solvents are useful for this purpose, although it is preferable that the solvent be an inert oxygenated organic solvent. For example, the following solvents can be successfully used: Alcohols, especially monohydric alcohols such as methanol, ethanol, propanol, isopropanol, butanol, hexanol, octanol, etc.; dioxane; tetrahydrofuran; ketones, such as acetone, methylethyl ketone, dibutyl ketone, etc.; and the like. Other suitable solvents for this purpose will now be known to those skilled in the art. A particularly preferred type of solvent for use in the present invention consists of glycol dialkyl ethers. These preferred solvents are illustrated by ethylene glycol dibutyl ether, diethylene glycol diethyl ether, diethylene glycol dibutyl ether, etc. Some of the advantages of these preferred solvents are that they readily dissolve the 4-halo-2-,6-dialkylphenols and strong bases used in this process; they possess high boiling points and thus the heat of reaction or heat supplied to the reaction does not boil off the solvent; the 3,3',5,5'-tetraalkyldiphenoquinones possess low solubility in these solvents at room temperature and thus can be removed therefrom very easily; and many of them are readily available as relatively inexpensive articles of commerce.

No extra solvent is ordinarily required when the base that is used is a very strong organic base, especially those of the amine series. Such bases themselves act as the solvent in creating the substantially homogeneous liquid system. On the other hand, some of the very strong organic bases, such as guanidine, which are not liquids at room temperature, are best used in combination with suitable solvents, such as the inert oxygenated solvents described above.

When the organic base has a strength not much greater than that of piperidine, it is preferable to use a high boiling inert organic solvent so that the oxidation-coupling reaction can be fostered by the use of elevated temperatures. Suitable high boiling inert organic solvents include liquid hydrocarbons boiling above about 150° C., nitrobenzene, orthodichlorobenzene, diethyl ether of diethylene glycol, dibutyl ether of diethylene glycol, stearyl alcohol, cetyl alcohol, and the like. Generally speaking, these high boiling inert organic solvents should boil within the range of about 150 to 250° C.

In all of the above instances at least a stoichiometric amount of the base is used in carrying out the reaction. In other words, the reaction system contains at least about one mole of the basic compound per mole of the 4-halo-2,6-dialkylphenol used or formed in situ.

The reaction conditions, other than those specified above, depend in part upon the particular type of base used. Thus, when an exceedingly strong base is used—e.g., a base such as sodium hydroxide, potassium ethoxide, etc.—the reaction temperature can range from about 0° to about 75° C. On the other hand, when somewhat weaker bases, such as piperidine, dipropylamine, etc., are used, the reaction temperature is best held in the range of about 60° C. to about 200° C. The reaction time is also affected by the nature of the base used. Generally speaking, the stronger the organic base, the shorter is the reaction time. The reaction time is also dependent upon the temperature used—in general, the higher the temperature, the shorter is the reaction time. Under most conditions a reaction time of 24 hours is maximum. Usually the reaction time is less than this and is frequently in the order of about 2 hours or less. Those skilled in the art will now clearly understand the reaction conditions under which the process of this invention is carried out.

The manner of carrying out the present process and the highly beneficial results achieved therefrom will be further apparent from the following specific examples in which all parts and percentages are by weight.

*Example I*

A mixture of 57.0 parts of 4-bromo-2,6-di-tert-butyl phenol, 40 parts of sodium hydroxide, 200 parts of water and 206 parts of dioxane was heated at reflux for 24 hours. Initially the mole ratio of sodium hydroxide to the bromophenol was 5:1. Upon treating the reaction mixture with ether and dilute aqueous sodium hydroxide, 30 parts of purple needles remained undissolved and were removed by filtration. The ether phase yielded an additional eight parts of this same solid. The product was identified as 3,3',5,5' - tetra - tert - butyldiphenoquinone, M.P. 244.5–245.5. A conversion of 93 percent was realized.

*Example II*

In a reaction vessel equipped with stirring and reflux means were placed 21.4 parts of 4-chloro-2,6-di-tert-butyl phenol, 8.5 parts of piperidine and 120 parts of nitrobenzene. The resulting mixture, which contained one mole of piperidine per mole of 4-chloro-2,6-di-tert-butyl phenol, was stirred at reflux for 6 hours. After cooling, the reaction mass was filtered to give eight parts of 3,3',5,5'-tetra-tert-butyldiphenoquinone. The filtrate was distilled to obtain nitrobenzene yielding a residue of 12 parts of the diphenoquinone. The total yield of 3,3',5,5'-tetra-tert-butyldiphenoquinone was over 85 percent of pure product in the form of purple crystals.

*Example III*

In the reaction vessel described in Example II was placed 79 parts of absolute methanol. Under nitrogen flush, 5.06 parts of clean, finely-divided sodium was added to the methanol over a half-hour period. While hot, a solution of 48.2 parts of 4-chloro-2,6-di-tert-butyl phenol in 120 parts of methanol was slowly added. The addition required 45 minutes during which time reflux (65° C.) was maintained by external heating. Stirring and refluxing were continued for 2 additional hours. The reaction mixture was then quenched in cold water and extracted with two portions (300 parts) of diethyl ether. Removal of the ether yielded a residue of purplish crystals. These crystals were then washed with hot ethanol leaving 19 parts of 3,3',5,5'-tetra-tert-butyldiphenoquinone, amounting to 75 percent yield.

*Example IV*

In a reaction vessel, 20 parts (0.5 mole) of sodium hydroxide and 51.5 parts (0.25 mole) of 2,6-di-tert-butyl phenol were dissolved in 160 parts of absolute methanol. This solution was stirred vigorously at 0° C. while 40 parts (0.25 mole) of bromine was added over a period of 55 minutes. After the addition of the bromine, the reaction mixture was stirred at 0° C. for one-half hour and then at 25° C. for 1¼ hours. The reaction mixture was filtered to remove solids which were washed with water to remove inorganic material. The filtrate was poured into 500 parts of cold water and the solids which formed separated and combined with those previously isolated. This material was crystallized from dimethoxyethane to give 23.4 parts (44.7 percent) of 3,3',5,5'-tetra-tert-butyldiphenoquinone.

*Example V*

The procedure described in Example IV was repeated using 320 parts of ethanol instead of the methanol. On completion of the reaction, the reaction mixture was added to 500 parts of water, the aqueous layer extracted with ether, the ether solution dried over magnesium sulfate and evaporated. The crude product was triturated with absolute ethanol, filtered and dried to give 24.6 parts (48 percent) of 3,3',5,5'-tetra-tert-butyldiphenoquinone. 4-bromo-2,6-di-tert-butylphenol was also recovered by evaporating the ethanol. A small portion of this bromophenol was crystallized from ethanol to give white prisms, M.P. 81–82.5° C.

Example VI

In a reaction vessel, 20 parts (0.5 mole) of sodium hydroxide and 51.5 parts (0.25 mole) of 2,6-di-tert-butylphenol were dissolved in 320 parts of ethanol. The mixture was stirred while 40 parts (0.25 mole) of bromine was added over a period of 55 minutes. Then the reaction mixture was refluxed for 4 hours. Using the work-up procedure of Example V, a total of 37.6 parts (74 percent) of 3,3',5,5'-tetra-tert-butyldiphenoquinone was obtained. The residues yielded 15.9 parts of 4-bromo-2,6-di-tert-butylphenol.

Example VII

In a reaction vessel was placed a solution of 44.5 parts (0.25 mole) of 2,6-diisopropylphenol and 20 parts (0.5 mole) of sodium hydroxide in 320 parts of absolute methanol. The reaction mixture was cooled to 0° C. and 40 parts (0.25 mole) of bromine added dropwise over a period of 45 minutes. After the addition of the bromine, the reaction mixture was refluxed for 4 hours and added to 500 parts of water. The resultant precipitate was filtered, dried and crystallized from dimethoxyethane to give 18.6 parts (43.2 percent) of 3,3',5,5'-tetraisopropyldiphenoquinone, M.P. 196–198° C.

Example VIII 600 parts of 2,6-di-tert-butylphenol and 240 parts of sodium hydroxide were dissolved in 4875 parts of ethylene glycol diethylether. 480 parts of bromine were added dropwise with stirring over a period of 30 minutes, resulting in a heat kick to 100° C. The reaction mixture was allowed to cool slowly with vigorous stirring. A deep-purple, crystalline precipitate formed during the cooling period. After filtration, this product was washed with a small amount of ethylene glycol diethylether, and air dried giving 525 parts of 3,3',5,5'-tetra-tert-butyldiphenoquinone, a yield of 87 percent.

Example IX 60 parts of 2-isopropyl-6-tert-butylphenol and 24 parts of potassium hydroxide were dissolved in 390 parts of ethylene glycol diethylether. 46 parts of bromine was added with stirring at 25° C. over a 15-minute period. The temperature rose to about 80° C. On cooling, a deep-purple, crystalline precipitate resulted which was recovered from the solution by filtration. This product was found to be 3,3'-di-tert-butyl-5,5'-diisopropyldiphenoquinone.

The manner of carrying out the present invention will now be clearly apparent to those skilled in the art.

Suitable 4-halo-2,6-dialkylphenols useful in the practice of one of the embodiments of this invention are exemplified by 4-chloro-2-methyl-6-isopropylphenol; 4-chloro-2-ethyl-6-isopropylphenol; 4-bromo-2-methyl-6-isopropylphenol; 4-chloro-2-methyl-6-tert-butylphenol; 4-bromo-2-methyl-6-tert-butylphenol; 4-iodo-2-methyl-6-tert-butylphenol; 4-chloro-2-ethyl-6-(2-amyl)-phenol; 4-bromo-2-butyl-6-(2-decyl)phenol; 4-iodo-2-octyl-6-(3-dodecyl)phenol; 4-bromo-2-methyl-6-(1,1,3,3-tetramethylbutyl)phenol; 4-chloro-2-ethyl-6-(2-hexyl)phenol; and the like. Preferred compounds of this type are illustrated by 4-chloro-2,6-diisopropylphenol; 4-bromo-2,6-diisopropylphenol; 4-chloro-2-isopropyl-6-tert-butylphenol; 4-iodo-2-isopropyl-6-tert-butylphenol; 4-chloro-2,6-di-sec-butylphenol; 4-bromo-2,6-di-tert-amylphenol; 4-iodo-2,6-di-(2-dodecyl)phenol; 4-bromo-2-isopropyl-6-(1,1,2,2-tetramethylpropylphenol); and the like. Particularly preferred compounds are 4-chloro-2,6-di-tert-butylphenol; 4-bromo-2,6-di-tert-butylphenol, and 4-iodo-2,6-di-tert-butylphenol. These compounds can be prepared by halogenating the appropriate phenol, orthocresol, orthoethyl phenol, or the like, under standard halogenating conditions to form the 4-halo-substituted compound. The resulting compound is then alkylated with an appropriate olefin using a standard alkylation catalyst, such as sulfuric acid, aluminum chloride, etc., to introduce one or two alkyl groups in the position or positions ortho to the hydroxyl group. For example, phenol is brominated to form 4-bromophenol which is then reacted with isobutylene as described in U.S. Patent 2,459,597 to form 4-bromo-2,6-di-tert-butylphenol. When orthocresol is used in place of phenol, the resulting product is 4-bromo-2-methyl-6-tert-butylphenol. Other branched chain alkyl groups are introduced into the phenolic nucleus by using the appropriate olefinic hydrocarbon, propylene yielding isopropyl groups, butene-1 yielding secondary butyl groups, diisobutylene yielding 1,1,3,3-tetramethylbutyl groups, etc.

The preferred way of preparing the above compounds is to first prepare the appropriate 2,6-dialkylphenol followed by halogenation of the same. To form the 2,6-dialkylphenol, unsubstituted phenol, orthocresol, orthoethyl phenol, or the like, is reacted with the appropriate olefinic hydrocarbon in the presence of an aluminum phenoxide catalyst. This process, which provides selective orthoalkylation, is described in U.S. patent application, Serial No. 426,556, filed April 29, 1954, by George G. Ecke and Alfred J. Kolka, now Patent No. 2,831,898, granted April 22, 1958. The resulting 2,6-dialkylphenol is then halogenated under standard conditions to form the 4-halo compound. For example, 2,6-di-tert-butylphenol is dissolved in a suitable solvent, such as carbon tetrachloride, and chlorine gas passed into the solution which is kept at about 50° C. After the evolution of HCl has ceased, 4-chloro-2,6-di-tert-butylphenol is recovered from the reaction mixture by standard work-up procedures.

In carrying out that preferred embodiment of the present invention involving conjoint use of a 2,6-dialkylphenol and free halogen, use is made of such phenols as 2-methyl-6-isopropylphenol, 2-ethyl-6-tert-butylphenol, 2-butyl-6-tert-butylphenol, 2-decyl-6-tert-butylphenol, and the like. Preferred phenols include 2,6-diisopropylphenol, 2-isopropyl-6-tert-butylphenol, 2-isopropyl-6-tert-amylphenol, 2,6-di-tert-amylphenol, 2,6-di-(2-dodecyl)phenol, and the like, with 2,6-di-tert-butylphenol being particularly preferred. The halogens used with these phenols are chlorine, bromine and iodine. In this embodiment, it is desirable to use approximately stoichiometric equivalents of the halogen and the phenol. Slight excesses of halogen in the order of about 10 percent of theoretical can be used.

The 3,3',5,5'-tetraalkyldiphenoquinones which are so readily prepared by the process of this invention find important use as antioxidants as described in British Patent 686,261. Moreover, these diphenoquinones are readily reduced to form the corresponding 3,3',5,5'-tetraalkyl-4,4'-dihydroxydiphenyls which are also useful as antioxidants as shown by U.S. Patent 2,479,948 and British Patent 687,293.

I claim:
1. Process of preparing 3,3',5,5'-tetraalkyl diphenoquinones from 4-halo-2,6-dialkylphenols wherein the alkyl groups contain not more than 12 carbon atoms each and at least one of the alkyl groups of said phenol is branched on its alpha carbon atom, said phenol being further characterized in that the halogen atom thereof has an atomic weight greater than 30; said process being characterized by preparing a liquid mixture consisting essentially of said 4-halo-2,6-dialkylphenol and at least about one mole of a basic compound per mole of said phenol, said basic compound having an ionization constant characteristic of a base of at least about $1.6 \times 10^{-3}$ at 25° C. in aqueous solution; and subjecting said mixture to a temperature of from about 60° C. to about 200° C. for a period in the order of about 2 to about 24 hours.

2. Process of claim 1 wherein said 4-halo-2,6,-dialkylphenol is further characterized in that the alkyl groups are both branched on their alpha carbon atoms.

3. Process of claim 2 wherein said 4-halo-2,6-dialkylphenol is a 4-halo-2,6-di-tert-butylphenol.

4. Process of preparing 3,3′,5,5′-tetraalkyl-diphenoquinones from 2,6-dialkylphenols in which the alkyl groups contain not more than 12 carbon atoms each and at least one of the alkyl groups of said phenol is branched on its alpha carbon atom; said process being characterized by preparing a liquid mixture consisting essentially of said phenol, a halogen having an atomic weight greater than 30, and at least about one mole of a basic compound per mole of said phenol, said basic compound having an ionization constant characteristic of a base of at least $1.6 \times 10^{-3}$ at 25° C. in aqueous solution; and maintaining the temperature of said mixture in the range of about 0° to 100° C. for a period in the order of about 2 to 24 hours.

5. Process of preparing 3,3′,5,5′-tetra-tert-butyl-diphenoquinone characterized by forming a mixture of 2,6-di-tert-butylphenol, bromine and sodium hydroxide in ethylene glycol diethyl ether as a solvent, there being present at least about one mole of sodium hydroxide per mole of 2,6-di-tert-butylphenol; and subjecting said mixture to temperatures in the range of 0° to 100° C. for a period in the order of about 2 to about 24 hours.

References Cited in the file of this patent

UNITED STATES PATENTS 2,785,188     Coe _____ Mar. 12, 1957